3,829,461
DYESTUFFS AND PROCESS FOR THEIR
PRODUCTION
Roderich Raue, Winfried Kruckenberg, and Ernst-Heinrich Rohe, Leverkusen, Germany, assignors to Bayer Aktiengesellschaft, Leverkusen, Germany
No Drawing. Filed Jan. 4, 1965, Ser. No. 423,361
Claims priority, application Germany, Jan. 17, 1964,
F 41,769
Int. Cl. C07c 121/60, 121/70
U.S. Cl. 260—465 D          9 Claims

ABSTRACT OF THE DISCLOSURE

A dyestuff of the formula:

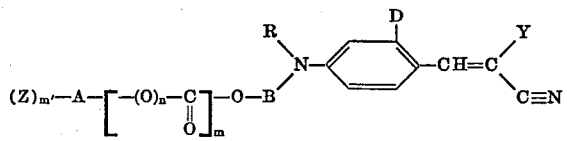

wherein Z stands for a member selected from the class consisting of hydrogen,

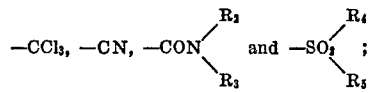

$m$ and $m'$ stand for an integer ranging from 0 to 1; $n$ stands for an integer ranging from 0 to 1; A stands for an arylene radical selected from the class consisting of a radical of the benzene and naphthalene series, B stands for an alkylene radical having 2 to 4 carbon atoms, R stands for a member selected from the class consisting of lower alkyl, lower alkyl aryl, cycloalkyl and

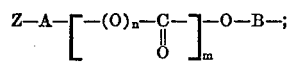

D stands for a member selected from the class consisting of hydrogen, lower alkyl, lower alkoxy and halogen; Y stands for a member selected from the class consisting of —CN, —SO$_2$R$_6$, —COOR$_7$ and

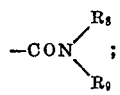

the radicals R$_2$, R$_3$, R$_4$, R$_5$, R$_8$ and R$_9$ stand for members selected from the class consisting of hydrogen, lower alkyl, lower alkyl aryl, cycloalkyl and aryl; the radicals R$_1$, R$_6$ and R$_7$ stand for members selected from the class consisting of lower alkyl, lower alkyl aryl, cycloalkyl and aryl; the dyestuff being free of sulfonic acid and carboxylic acid groups.

The dyestuffs of this invention are particularly suitable for the dyeing and printing of aromatic polyesters, polycarbonates, polyamides, and cellulose esters.

---

The present invention relates to new valuable dyestuffs of the general formula

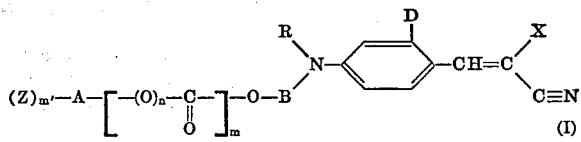

in which Z denotes hydrogen or a —CCl$_3$, —CN, —COOR$_1$,

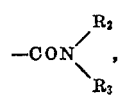

or a

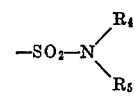

group, $m$ and $m'$ mean the number 0 or 1, $n$ is the number 0 or 1, A denotes an aryl radical, B means an alkylene radical with 2 to 4 carbon atoms, R means an alkyl, aralkyl or cycloalkyl radical or the group $$Z-A-\left[-(O)_n-\underset{\underset{O}{\|}}{C}-\right]_m-O-B-,$$

D denotes hydrogen, an alkyl or alkoxy radical or a halogen atom, Y means —CN, —SO$_2$R$_6$, —COOR$_7$ or

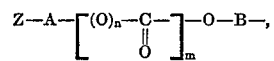

the substituents R$_2$, R$_3$, R$_4$, R$_5$, R$_8$ and R$_9$ denote hydrogen, alkyl, aralkyl, cycloalkyl or aryl radicals, and R$_1$, R$_6$ and R$_7$ mean alkyl, aralkyl, cycloalkyl or aryl radicals; in place of the alkyl, aralkyl, cycloalkyl, and aryl radicals mentioned above, there may be employed substituted alkyl, aralkyl, cycloalkyl, and aryl, wherein the substituents are non-ionic radicals, such as chlorine, bromine, cyano, alkyl, aralkyl, aryl, carboxylic acid esters and possibly N-substituted carbonamide and sulphonamide groups; the novel dyestuffs (I) are free of sulphonic acid and carboxylic acid groups.

The new dyestuffs can be produced by reacting aldehydes of the general formula

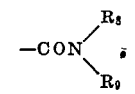

or their functional derivatives, with methylene compounds of the general formula $$H_2C\underset{CN}{\overset{Y}{\diagup}} \qquad (III)$$

wherein Z, A, B, D, R, Y, $m$ and $n$ have the meaning stated above. The reaction is carried out at temperatures of 20° C. to 150° C. in the presence or absence of an inert solvent. Suitable solvents are, for example, methanol, ethanol, dioxan, dimethyl formamide, dimethyl sulphoxide or chloroform. Catalysts may be added to accelerate the reaction, for example piperidine, triethylamine, diethylamine, basic ion exchangers, potassium hydroxide, sodium alcoholate and potassium alcoholate.

The aldehydes of the formula (II) are prepared from the corresponding amines of the general formula

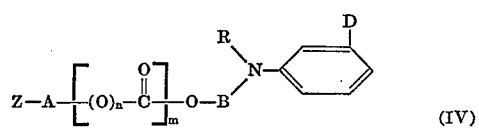

by methods known as such, for example according to the so-called "Vilsmeier reaction" by reaction with phosphorus oxychloride or phosgene and dimethyl formamide.

The compounds of the formula (IV) are in turn obtained by reacting compounds of the general formula

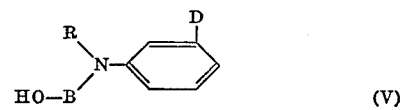

with compounds of the general formula

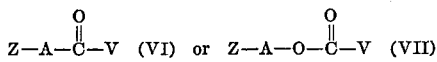

wherein the radicals Z, A, B, R and D have the meaning stated above and V stands for chlorine, bromine or the imidazolyl radical. This reaction is carried out in the presence of an acid-binding agent, such as potassium carbonate, sodium carbonate, magnesium oxide, pyridine, quinoline, triethylamine, trimethylamine, dimethyl aniline, hexahydro-dimethyl-aniline, and, if desired, in the presence of an inert diluent. Suitable inert diluents for this process are, for example, chlorobenzene, o-dichlorobenzene, toluene, xylene or dioxan.

Preferred lower alkyl radicals $R_1$ to $R_9$ are those having 1 to 4 carbon atoms, such as methyl, ethyl, propyl, isopropyl, butyl and isobutyl. Aralkyl radicals of particular interest are the benzyl residue as well as non-ionically substituted benzyl residues, such as lower methylbenzyl, nitrobenzyl, lower alkoxybenzyl and halogeno substituted benzyl. Preferred aryl radicals are those having one or two aromatic carbocyclic rings, i.e. those of the benzene and naphthalene series which may contain non-ionic substituents, such as nitro groups, halo substitutents, lower alkyl and lower alkoxy residues, sulfonamido and substituted sulfonamido groups, carbonamido groups, sulfone groups and carbo lower alkoxy groupings.

Suitable compounds of the formula (V) are, for example:

N-methyl-N-hydroxyethyl-aniline,
N-ethyl-N-hydroxy-ethylaniline,
N-chloroethyl-N-hydroxyethyl-aniline,
N-cyanoethyl-N-hydroxyethylaniline,
N-butyl-N-hydroxyethyl-aniline,
N-benzyl-N-hydroxyethyl-aniline,
N-cyclohexyl-N-hydroxyethyl-aniline,
3-methyl-N-methyl-N-hydroxyethyl-aniline,
3-methyl-N-ethyl-N-hydroxyethyl-aniline,
3-methyl-N-butyl-N-hydroxy-ethyl-aniline,
3-ethyl-N-ethyl-N-hydroxyethyl-aniline,
3-methoxy-N-methyl-N-hydroxyethyl-aniline,
3-chloro-N-butyl-N-hydroxyethyl-aniline.

Suitable compounds of the formula (VI) are, for example, benzoyl chloride,
4-carbomethoxy-benzoyl chloride,
4-carboethoxy-benzoyl chloride,
4-carbobutoxy-benzoyl chloride,
4-carbo-(4'-chloro)-benzyloxy-benzoyl chloride,
4-carbobenzyloxybenzoyl chloride,
3-carbomethoxy-benzoyl chloride,
4-dimethylcarbonamido-benzoyl chloride,
4-diethyl-carbonamido-benzoyl chloride,
4-butyl-chloroethyl-carbonamido-benzoyl chloride,
4-N-methyl-N-benzyl-carbonamido-benzoyl chloride,
4-N-methyl-N-phenyl-carbonamido-benzoyl chloride,
4-sulphonamido-benzoyl chloride,
4-N-methyl-sulphonamido-benzoyl chloride,
4-N,N-dimethyl-sulphonamido-benzoyl chloride,
4-N-methyl-N-benzyl-sulphonamido-benzoyl chloride,
4-N,N-diethylsulphonamido-benzoyl chloride,
4-N-butyl-N-chloroethyl-sulphonamido-benzoyl chloride,
N-methyl-N-phenylsulphonamido-benzoyl chloride,
4-cyanobenzoyl chloride or
3-sulphonamido-benzoyl chloride.

Suitable compounds of the formula (VII) are, for example, chloroformic acid phenyl ester, chloroformic acid-4-carbomethoxy-phenyl ester, chloroformic acid-4-carbonamidophenyl ester, chloroformic acid-2,4-dicarbomethoxyphenyl ester, chloroformic acid-2-naphthyl ester, chloroformic acid-3-carbomethoxy-2-naphthyl ester.

From compounds of the general formula

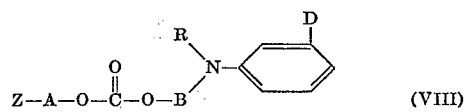

there result by the action of heat, with the splitting off of carbon dioxide, compounds of the general formula

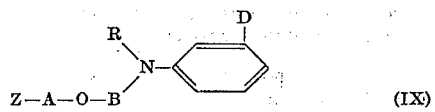

which are likewise suitable intermediate products of the compound of formula (IV).

Methylene compounds of the formula (III) which are suitable for the production of the new deystuffs are, for example, malonic acid dinitrile, cyanoacetic acid methyl ester, cyanoacetic acid ethyl ester, cyanoacetic acid butyl ester, cyanoacetic acid benzylester, cyanoacetic acid-4-chloro-benzylester, cyanoacetamide, cyanoaceto-methylamide, cyanoaceto-dimethylamide, cyanoaceto-N-benzylamide, cyanoaceto-anilide, cyanoaceto-diethylamide, cyanoaceto-N-butylamide, methyl-sulphonyl-acetonitrile, 4-methyl-phenyl-sulphonyl-acetonitrile, 4-chlorophenyl-sulphonyl-acetonitrile, 4-benzyl-sulphonyl-acetonitrile and 4-ethyl-phenylsulphonyl-acetonitrile.

As functional derivatives of aldehydes of the formula (II) the enamine salts are of particular technical importance; those enamine salts correspond, for instance, to the general formula

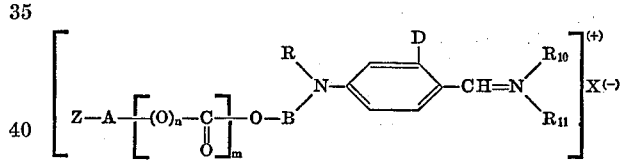

in which Z, A, B, D, R, $m$ and $n$ have the meaning stated above, $R_{10}$ stands for alkyl ($C_1$–$C_4$), $R_{11}$ for alkyl ($C_1$–$C_4$) or phenyl which may be substituted by lower alkyl, lower alkoxy or halogen, and X for an acid radical, and which are obtained as intermediate products in the synthesis according to Vilsmeier.

The new dyestuffs (I) are eminently suitable for the dyeing and printing of aromatic polyesters, for example those from terephthalic acid and glycol or 1,4-bis-hydroxy-methyl-cyclohexane, or for the dyeing and printing of polycarbonates, for example those from dimethyl-dihydroxy-phenyl-methane and phosgene, as well as for the dyeing and printing of synthetic super-polyamides, polyurethanes and cellulose esters, especially cellulose triacetate. The dyeings are distinguished by outstanding fastness to light, very good fastness to washing and fastness to subliming. The dyestuffs are also excellently suitable for dyeing at temperatures above 100° C., and in mixed fabrics of wool and polyester they leave the wool component undyed.

In mixtures with blue dyestuffs of the anthraquinone series the new dyestuffs yield on cellulose triacetate green dyeings of excellent fastness to light.

The dyestuffs also possess a good solubility in organic solvents and are suited for colouring lacquers and oils, for dyeing synthetic fibres in the mass, and for colouring polystyrene and polyethylene. The dyestuffs are moreover soluble with fibre-forming polymers in organic solvents and can be used in the usual manner for spin-dyeing processes.

The following examples are given for the purpose of illustrating the invention without, however, limiting it thereto; the parts being parts by weight.

Example 1

38 Parts of the aldehyde of the formula

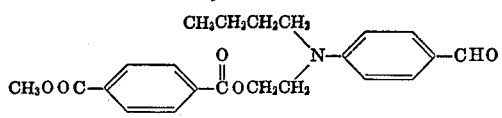

and 12 parts of cyanoacetic acid ethyl ester are boiled under reflux in 20 parts of ethanol with the addition of 1 part of piperidine for 2 hours. Upon cooling the styryl dyestuff of the formula

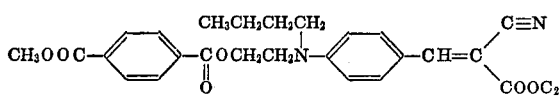

crystallises in the form of yellow crystals which are filtered off with suction and recrystallised from alcohol. M.p. 120–121° C.

This substance dyes polyester and polyamide fibres as well as triacetate rayon in clear greenish yellow shades of very good fastness to light, wet processing and subliming and with a high intensity of colour.

By using, instead of cyanoacetic acid ethyl ester, the equivalent amount of malonic dinitrile, a greenish yellow dyestuff (m.p. 88–90° C.) with similar properties is obtained.

100 Parts of a fabric of triacetate rayon are heated at 98–100° C. for 60 minutes in a dyebath containing 2 parts of the first-mentioned dyestuff of this Example, 4 parts of Marseilles soap and 4000 parts of water. A greenish yellow dyeing of very good fastness to light and wet processing is obtained.

The aldehyde required for the synthesis of the dyestuffs is obtained as follows:

19.3 Parts of N-butyl-N-β-hydroxyethyl-aniline are dissolved in 100 parts of benzene and reacted in the presence of 13.8 parts of finely powdered potassium carbonate with 19.9 parts of terephthalic acid methyl ester chloride. After filtering off the potassium carbonate, the reaction product is purified by distillation (b.p. 230–235° C. at 0.6 mm. Hg). 35.5 Parts of this substance are dissolved in 100 parts of chlorobenzene and added dropwise at 50–55° C. to a Vilsmeier mixture of 30.7 parts of phosphorus oxychloride and 14.6 parts of dimethyl formamide. After stirring at the stated temperature for 12 hours, the reaction mixture is decomposed by means of ice water and rendered alkaline with a concentrated sodium hydroxide solution. The aldehyde is shaken with chlorobenzene and, after distilling off the solvent, it is isolated in the form of an oil which gradually solidifies.

Example 2

40 Parts of the aldehyde of the formula

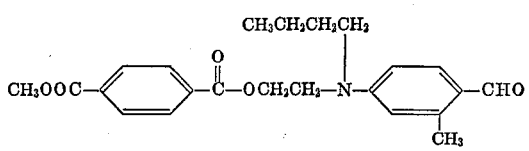

are heated with 7 parts of malonic dinitrile in a n-butanol and in the presnce of 1 part of triethylamine for several hours, and the resultant dyestuff is separated by cooling the reaction mixture. After recrystallisation from ethanol, yellow crystals of m.p. 112–114° C. are obtained.

The dyestuff dyes materials of polyesters and polyamide as well as cellulose esters in clear greenish yellow shades of outstanding fastness to light, wet processing and subliming.

100 Parts of a fibre material of polyethylene glycol terephthalate are dyed in a bath containing 2 parts of this dyestuff and 20 parts of a carrier (cresotic acid ester) in 4000 parts of water, initially at 80–85° C. for 15–20 minutes and then at boiling temperature for 60–90 minutes. A clear greenish yellow dyeing of outstanding fastness to light, washing and waste gas is obtained. The dyeing is further distinguished by very good fastness to subliming.

To improve the dispersion, the dyestuff, in the form of an aqueous paste, can also be intimately mixed with the dispersing agent before the dyeing process and, after suitable drying, be used as a dyestuff powder.

By using for the preparation of the dyestuff, instead of malonic dinitrile, cyanoacetic acid methyl ester, cyanoacetamide, cyanoacetic acid benzylamide or methylsulphonyl-acetonitrile, the procedure being otherwise the same as described above, greenish yellow dyestuffs with similar fastness properties are obtained.

The aldehyde mentioned above is obtained in the following manner:

20.7 Parts of N-butyl-N-β-hydroxyethyl-m-toluidine and 19.9 parts of terephthalic acid methyl ester chloride are heated in the presence of 11 parts of triethylamine at 80–100° C. for several hours. When the reaction is completed, the product is dissolved in 100 parts of chlorobenzene, separated from the precipitated triethylamine hydrochloride, and formylated at 40–50° C. by means of a Vilsmeier mixture of phosphorus oxychloride and dimethyl formamide. The aldehyde is a viscous oily substance which crystallises on triturating with heptane (m.p. 53–56° C.).

Example 3

39 Parts of the aldehyde of the formula

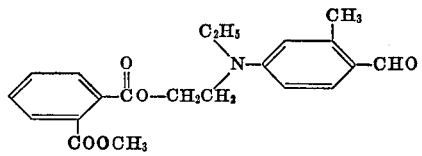

and 7 parts of malonic dinitrile are reacted as described in Example 2. A yellow methine dyestuff of m.p. 100–101° C. is obtained, which dyes fibres of terephthalic acid ester, cellulose esters and polyamide material in clear greenish yellow shades with very good fastness to washing, subliming and light, giving high yields.

The aldehyde employed is obtained by adding 90 parts of phthalic acid methyl ester chloride dropwise at 40–50° C. to 66 parts of N-ethyl-N-β-hydroxyethyl-m-toluidine. After standing at room temperature for 12 hours, the crude product is taken up with 100 parts of chlorobenzene, treated with an aqueous potassium carbonate solution and the organic phase is separated. To complete the reaction, another 10 parts of phthalic acid methyl ester chloride are allowed to act on the mixture at room temperature. The resultant chlorobenzenic solution is formylated by usual methods, the reaction product being obtained in the form of a viscous oil.

Example 4

37 Parts of the aldehyde of the formula

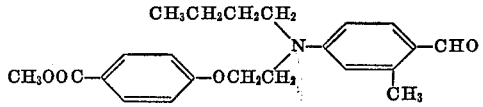

are condensed in 100 parts of ethanol with 7 parts of malonic dinitrile in the presence of piperidine. A yellow dyestuff of m.p. 84–87° C. is thus formed, which draws on fibres of aromatic polyesters and polyamides and on material of triacetate rayon giving very clear greenish yellow shades. The dyeings are distinguished by outstanding fastness to light, wet processing and subliming.

25 Parts of this dyestuff are mixed with 5000 parts of polystyrene and melted in usual manner under nitrogen at about 200° C. The melt is worked up in the customary manner and yields greenish yellow injection moulded parts with good fastness properties.

100 Parts of a fabric of synthetic super-polyamides are introduced at 30–40° C. into a dyebath containing 2 parts of the styryl dyestuff of this Example and 2 parts of a condensation product from aromatic sulphonic acids, e.g. naphthalene sulphonic acid, and formaldehyde in 4000 parts of water. The temperature is raised to 96–98° C. within 20–30 minutes and dyeing is carried out at this temperature for 50–60 minutes. A fabric is thus obtained which is dyed in a yellowish green shade with very good fastness to wet processing and good fastness to light.

To obtain the above-mentioned aldehyde, N-butyl-N-β-hydroxyethyl-m-toluidine is reacted with chloroformic acid-4-carbomethoxyphenyl ester in the presence of potassium carbonate by heating in benzene for several hours. After separating the inorganic salts, the solvent is removed by distillation and the oily residue slowly heated under reduced pressure. The splitting off of carbon dioxide sets in at about 100° C. and is completed by further heating at 150–200° C. The crude product is purified by vacuum distillation (b.p. 198–207° C. at 0.5–0.6 mm. Hg). By the action of dimethyl formamide and phosphorus oxychloride the aldehyde is formed according to known processes; it is an oily substance which can be purified by distillation (b.p. 279–280° C. at 1.6 mm. Hg).

The following Table gives a summary of a number of further valuable dyestuffs which can be obtained according to one of the processes described above. Different radicals and indices are related to the general formula (I) and correspond to the general formula stated above:

| $Z-A-[(O)_n-\overset{O}{\underset{\|}{C}}-O-B-]_m$ | R | D | Y | Shade of the dyestuff on fibres of polyester or triacetate |
|---|---|---|---|---|
| 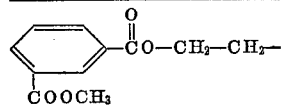 | $C_4H_9$ | H | CN | Greenish yellow. |
| 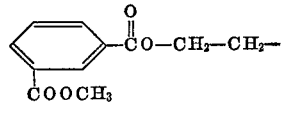 | $C_2H_5$ | $CH_3$ | CN | Do. |
| 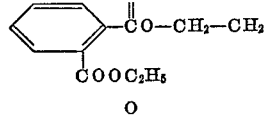 | $C_4H_9$ | $CH_3$ | CN | Do. |
| 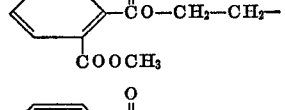 | $C_2H_5$ | $CH_3$ | CN | Do. |
| 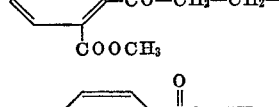 | $C_2H_5$ | $CH_3$ | $COOC_2H_5$ | Do. |
| 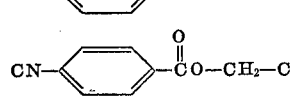 | $C_2H_5$ | H | $COOC_2H_5$ | Do. |
| 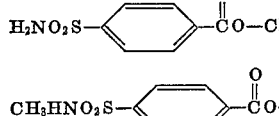 | $C_2H_5$ | $CH_3$ | CN | Do. |
|  | $C_4H_9$ | $CH_3$ | CN | Do. |
|  | $C_4H_9$ | H | CN | Do. |
|  | $CH_3$ | $CH_3$ | CN | Do. |
|  | $CH_3$ | $CH_3$ | $CONH_2$ | Do. |
|  | $C_2H_5$ | $CH_3$ | CN | Do. |
|  | $C_2H_5$ | $CH_3$ | $COOC_2H_5$ | Do. |
|  | $C_4H_9$ | H | CN | Do. |

TABLE—Continued

| $Z-A-[(O)_n-\overset{O}{\underset{\|}{C}}-]_m O-B-$ | R | D | Y | Shade of the dyestuff on fibres of polyester or triacetate |
|---|---|---|---|---|
| $H_3COOC-\langle\bigcirc\rangle-O-CH_2-CH_2-$ | $C_2H_5$ | H | CN | Do. |
| $H_3COOC-\langle\bigcirc\rangle-O-CH_2-CH_2-$ | $C_2H_5$ | H | $COOC_2H_5$ | Do. |
| $C_4H_9OOC-\langle\bigcirc\rangle-O-CH_2-CH_2-$ | $C_4H_9$ | H | CN | Do. |
| $H_3COOC-\langle\bigcirc\rangle\overset{-OCH_2-CH_2-}{\underset{COOCH_3}{}}$ | $C_4H_9$ | $CH_3$ | CN | Do. |
| $\overset{COOC_2H_5}{\underset{-OCH_2-CH_2}{\langle\bigcirc\bigcirc\rangle}}$ | $C_4H_9$ | $CH_3$ | CN | Do. |
| $C_2H_5OOC-\langle\bigcirc\rangle-\overset{O}{\underset{\|}{C}}O-CH_2-CH_2-$ | $C_2H_5$ | $OCH_3$ | CN | Do. |
| $H_5C_2OOC-\langle\bigcirc\rangle-\overset{O}{\underset{\|}{C}}O-CH_2-CH_2-$ | $C_2H_5$ | $CH_3$ | $SO_2-C_6H_5$ | Do. |
| $Cl_3C-\langle\bigcirc\rangle-\overset{O}{\underset{\|}{C}}O-CH_2-CH_2-$ | $C_2H_5$ | $OCH_3$ | CN | Do. |
| $(CH_3)_2NO_2S-\langle\bigcirc\rangle-\overset{O}{\underset{\|}{C}}O-CH_2-CH_2-$ | $C_2H_5$ | $CH_3$ | CN | Do. |
| $(CH_3)_2NO_2S-\langle\bigcirc\rangle-\overset{O}{\underset{\|}{C}}O-CH_2-CH_2-$ | $C_2H_5$ | H | $COOC_2H_5$ | Do. |

Example 5

28.3 Parts of the aldehyde of the formula

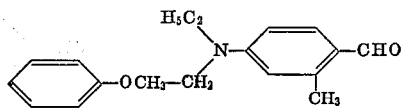

are reacted in 100 parts of ethanol with 11.3 parts of cyanoacetic acid ethyl ester in the presence of catalytic amounts of piperidine. 20 Parts of a dyestuff of m.p. 74–75° C. are obtained, which, when applied in the usual manner, dyes materials of aromatic polyesters in greenish yellow shades with very good fastness to wet processing and light.

To obtain the above-mentioned aldehyde, 59.5 parts of N-ethyl-N-β-chloroethyl-m-toluidine are reacted with 34.8 parts of sodium phenolate by heating in 100 parts of dimethyl formamide. The reaction product is isolated by pouring the reaction mixture into water and shaking the organic phase with chlorobenzene, and after a vacuum distillation (b.p. 155–163° C. at 0.5–0.8 mm. Hg), it is obtained in the form of a viscous oil. The aldehyde is formed therefrom by the action of dimethyl formamide and phosphorus oxychloride.

Example 6

45 Parts of the aldehyde of the formula

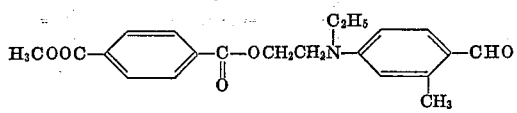

are condensed in 80 parts of ethanol with 8.0 parts of malonic dinitrile in the presence of piperidine to form a greenish yellow dyestuff of melting point 136–138° C.

The aldehyde required is obtained by heating 59.8 parts of N-ethyl-N-β-chloroethyl-m-toluidine in 357 parts of dimethyl formamide with 72.5 parts of the potassium salt of terephthalic acid monomethyl ester at 140° C. for 7 hours. After filtering off the resultant potassium chloride, 214 parts of dimethyl formamide are distilled off. The esterification product is formylated by adding 95 parts of phosphorus oxychloride to the residue, and the aldehyde is isolated by usual methods. 100 Parts of a viscous oil are obtained, which crystallises after some time (m.p. 77–80° C.).

Example 7

6.5 Parts of the aldehyde of the formula

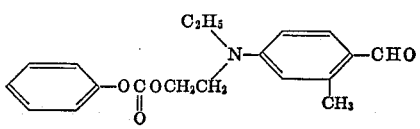

are condensed with 1.3 parts of malonic dinitrile. A greenish yellow dyestuff is obtained which dyes materials of aromatic polyesters or triacetate rayon with very good fastness to light, wet processing and subliming.

To prepare the aldehyde, 71.5 parts of N-hydroxyethyl-N-ethyl-m-toluidine are reacted with 69.0 parts of chloroformic acid phenyl ester in the presence of 44.5 parts of triethylamine at room temperature. After diluting the reaction mixture with 100 parts of benzene, the resultant triethylamine hydrochloride is filtered off with suction, and, after evaporation of the solvent, the reaction product is obtained from the filtrate as a viscous oil. It is formylated in known manner according to Vilsmeier.

Example 8

10 Parts of the aldehyde of the formula

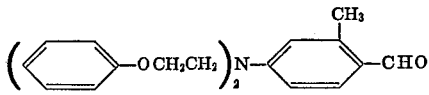

are dissolved in 50–100 parts of alcohol and heated with 2 parts of malonic dinitrile and 0.1 part of piperidine at boiling temperature for 90 minutes. Upon cooling, the dyestuff of the formula

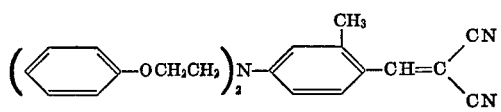

crystallises. The dyestuff can be recrystallised from acetonitrile. It is suitable for dyeing and printing polyester materials in very fast greenish yellow shades.

The aldehyde employed is obtained as follows:

24 Parts of sodium phenolate and 23.2 parts of N,N-bis-β-chloroethyl-m-toluidine are heated with 50 parts of diethylene glycol dimethyl ether at boiling temperature for 1–2 hours. After cooling, the mixture is diluted with 500 parts of water and the separated oil is taken up with about 100 parts of chloroform. The chloroform layer is washed several times with water, the chloroform is then distilled off and the residue is heated at about 200° C. under a pressure of 0.5–1 mm. Hg in order to remove the residual glycol ether. 33.5 Parts of a viscous oil are obtained, which is dissolved in 10 parts of dimethyl formamide. 16 Parts of phosphorus oxychloride are allowed to run into this solution at 50–60° C. The mixture is heated at 60° C. for 8 hours and the mass is poured into 500–1000 parts of water while still warm. The aldehyde precipitates first as an oil and solidifies upon stirring. After recrystallisation from alcohol, the melting point is 82–84° C.

The following dyestuffs can be prepared in accordance wtih the method described in Example 4 by choosing appropriate starting materials:

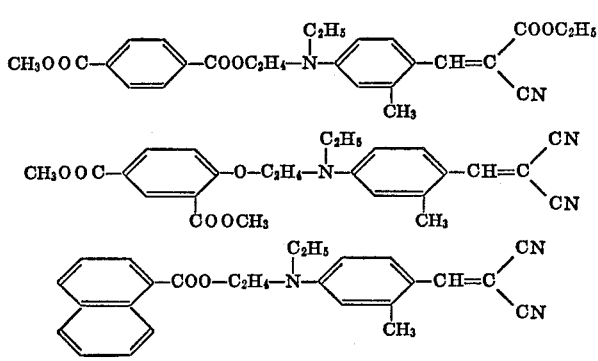

The dyestuffs dye polyester and triacetate fibres yellowish shades.

We claim:

1. A dyestuff of the formula:

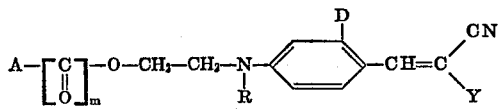

wherein A is selected from the group consisting of

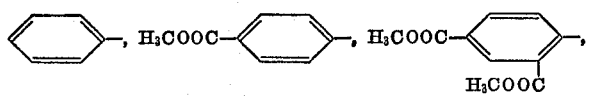

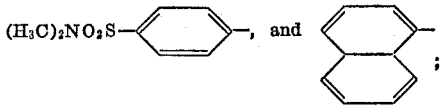

$m$ is an integer of 0 to 1; R is an unsubstituted lower alkyl of 1 to 5 carbon atoms; D is hydrogen or an unsubstituted lower alkyl of 1 to 2 carbon atoms; and Y is —CN or —COOR$_1$, where R$_1$ is an unsubstituted lower alkyl of 1 to 4 carbon atoms.

2. A dyestuff of the formula:

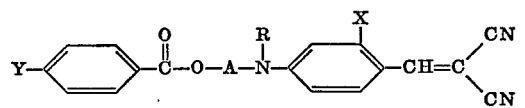

wherein X is hydrogen or methyl; R is a lower alkyl; A is a lower alkylene of 2 to 4 carbon atoms and Y is hydrogen or

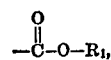

wherein R$_1$ is a lower alkyl.

3. The dyestuff of the formula

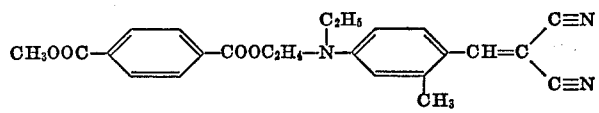

4. The dyestuff of the formula

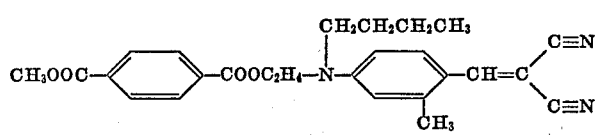

5. The dyestuff of the formula

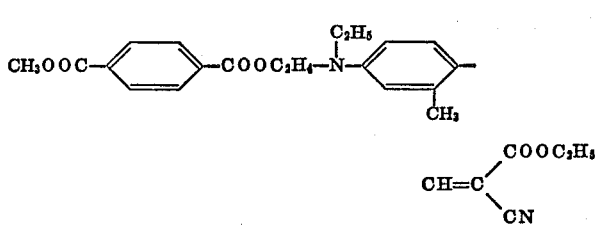

6. The dyestuff of the formula

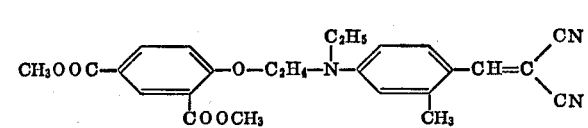

7. The dyestuff of the formula

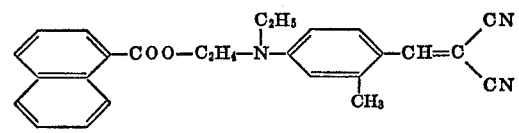

8. The dyestuff of the formula

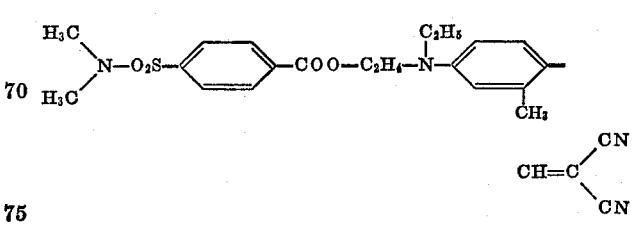

9. The dyestuff of the formula
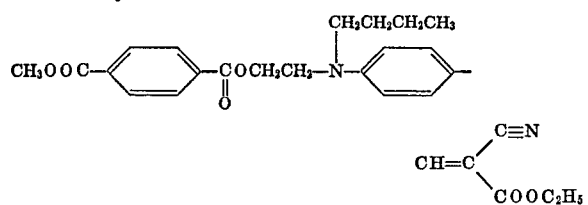
References Cited
UNITED STATES PATENTS
| | | | |
|---|---|---|---|
| 2,226,054 | 12/1940 | Felix et al. | 260—465 |
| 2,583,551 | 1/1952 | Dickey et al. | 260—465 |
| 2,583,614 | 1/1952 | Taylor et al. | 260—465 |
| 2,850,520 | 9/1958 | Merian et al. | 260—465 |
| 2,936,319 | 5/1960 | Merian et al. | 260—465 |
| 3,390,168 | 6/1968 | Brack | 260—465 E |
| 3,398,152 | 8/1968 | Wallace et al. | 260—465 E X |
| 3,422,133 | 1/1969 | Dale III et al. | 260—465 D |
| 3,435,062 | 3/1969 | Marrable | 260—465 D |
| 3,555,016 | 1/1971 | Peter et al. | 260—465 E X |
| 3,580,946 | 5/1971 | Anderton | 260—465 D |
JOSEPH PAUL BRUST, Primary Examiner
U.S. Cl. X.R.
260—463, 465 E, 470, 473 A, 475 R, 573